(12) United States Patent
Luo et al.

(10) Patent No.: US 7,145,507 B2
(45) Date of Patent: Dec. 5, 2006

(54) VEHICLE LOCATING SYSTEM USING GPS

(75) Inventors: Yi Luo, Detroit, MI (US); Oingfeng Tang, Novi, MI (US); Ronald O. King, Brownstown, MI (US); Thomas J. Lemense, Farmington, MI (US)

(73) Assignee: Lear Corporation, Southfield, MI (US)

( * ) Notice: Subject to any disclaimer, the term of this patent is extended or adjusted under 35 U.S.C. 154(b) by 175 days.

(21) Appl. No.: 10/737,104

(22) Filed: Dec. 16, 2003

(65) Prior Publication Data

US 2005/0128140 A1  Jun. 16, 2005

(51) Int. Cl.
*G01S 5/14* (2006.01)
(52) U.S. Cl. .......................... 342/357.08; 342/357.09; 340/539.13
(58) Field of Classification Search ................. 342/457, 342/456, 357.09, 357.15, 357.08; 340/539.13
See application file for complete search history.

(56) References Cited

U.S. PATENT DOCUMENTS

| | | | |
|---|---|---|---|
| 4,445,118 A | 4/1984 | Taylor et al. | |
| 5,883,594 A * | 3/1999 | Lau | 342/357.1 |
| 6,204,808 B1 * | 3/2001 | Bloebaum et al. | 342/357.07 |
| 6,346,878 B1 | 2/2002 | Pohlman et al. | |
| 6,363,324 B1 | 3/2002 | Hildebrant | |
| 6,392,592 B1 | 5/2002 | Johnson et al. | |
| 6,407,698 B1 * | 6/2002 | Ayed | 342/357.07 |
| 6,429,791 B1 | 8/2002 | Quinn | |
| 6,489,921 B1 * | 12/2002 | Wilkinson | 342/357.08 |
| 6,529,142 B1 | 3/2003 | Yeh et al. | |
| 6,650,999 B1 * | 11/2003 | Brust et al. | 701/213 |
| 6,720,915 B1 * | 4/2004 | Sheynblat | 342/357.05 |
| 6,725,138 B1 * | 4/2004 | DeLuca et al. | 701/36 |
| 6,791,477 B1 * | 9/2004 | Sari et al. | 340/825.36 |
| 2002/0008614 A1 | 1/2002 | Yeh et al. | |
| 2002/0008660 A1 | 1/2002 | Johnson et al. | |
| 2002/0067249 A1 | 6/2002 | Johnson et al. | |
| 2002/0105444 A1 | 8/2002 | Flick | |
| 2003/0020638 A1 | 1/2003 | Sari et al. | |

OTHER PUBLICATIONS

Frank van Diggelen et al., *Indoor GPS Technology*, Global Locate, Inc., May 2001, pp. 1-10.

* cited by examiner

*Primary Examiner*—Gregory C. Issing
(74) *Attorney, Agent, or Firm*—MacMillan, Sobanski & Todd LLC

(57) ABSTRACT

A vehicle locating system for directing a user to a remotely-located vehicle comprises a vehicle-mounted location unit and a personal fob. The vehicle-mounted location unit includes a first global positioning receiver for receiving satellite location signals which operates at a duty cycle sufficient to maintain predetermined aiding data. The vehicle-mounted location unit processes vehicle location data and further includes a first local data transceiver for transmitting the predetermined aiding data. The portable fob includes a second global positioning receiver for receiving the satellite location signals, wherein the second global positioning receiver operates substantially only when the user initiates a request for directions to the vehicle. The portable fob further includes a second local data transceiver for receiving the predetermined aiding data from the first local data transceiver. The portable fob processes fob location data in response to the predetermined aiding data.

20 Claims, 3 Drawing Sheets

VEHICLE LOCATING SYSTEM USING GPS

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to a remote vehicle locating system for assisting a user to find their vehicle, such as in a parking lot, and, more specifically, to a vehicle locating system having receivers of GPS satellite signals mounted in a personal fob and in the vehicle to be located.

Car locating systems having a portable GPS receiver carried by the vehicle user and a car-mounted GPS receiver have been proposed. Typically, a GPS-derived location of the car when it is parked is downloaded to the portable receiver as a waypoint. Later, when the user wants to return to the vehicle, the portable receiver is actuated to determine its current location and to then provide a direction and distance to the vehicle waypoint.

GPS receivers depend on several types of information contained within the signals broadcast by the GPS satellites in order to make a determination of their geographic position. A 1 MHz pseudo-random noise code modulates a 1575.42 MHz carrier, with each GPS satellite having a unique pseudo-random noise code. The carrier is also modulated with a 50 Hz navigation message containing data describing satellite orbits (i.e., ephemeris), clock corrections, and other GPS system data.

To determine the range to a particular satellite, the receiver determines a time difference between when a pseudo-random noise code is admitted from the satellite and when it is received by the receiver (with the final receiver position being determined by triangulation of ranges to multiple satellites). An accurate determination of the time difference depends greatly on the data in the navigation message. However, due to the low data rate used for the navigation message, it takes 12.5 minutes to send a complete message.

GPS receivers typically maintain baseline navigation data, such as satellite ephemeris data, and refine the data based on updated information received in the navigation message. Accuracy of the clock utilized in a GPS receiver also depends on continuous monitoring of both the navigation data and the pseudo-random noise codes from multiple satellites.

When a GPS receiver is activated after having been powered off (i.e., a cold start), it does not possess any current navigation data and its internal clock may be significantly off from GPS time. Therefore, any position determinations are subject to greater inaccuracy until sufficient amounts of navigation data and monitoring of multiple satellite signals have been achieved.

A handheld mobile GPS receiver is typically powered by a battery. A miniaturized receiver such as one contained in a vehicle remote entry fob can only accommodate a small battery. Because of the limited capacity of a small battery, it is undesirable to run such a GPS receiver continuously since the battery life would be consumed too quickly. Upon a cold start, however, a sufficiently accurate position determination may not be possible until after an unacceptably long delay.

SUMMARY OF THE INVENTION

The present invention has the advantage of quickly determining a location of a fob in a manner that conserves battery power. In one aspect of the invention, a vehicle locating system for directing a user to a remotely located vehicle comprises a vehicle-mounted location unit and a personal fob. The vehicle-mounted location unit includes a first global positioning receiver for receiving satellite location signals, which operates at a duty cycle sufficient to maintain predetermined aiding data. The vehicle-mounted location unit processes vehicle location data and further includes a s first local data transceiver for transmitting the predetermined aiding data. The portable fob includes a second global positioning receiver for receiving the satellite location signals, wherein the second global positioning receiver operates substantially only when the user initiates a request for directions to the vehicle. The portable fob further includes a second local data transceiver for receiving the predetermined aiding data from the first local data transceiver. The portable fob processes fob location data in response to the predetermined aiding data.

DETAILED DESCRIPTION OF PREFERRED EMBODIMENTS

Figure 1:
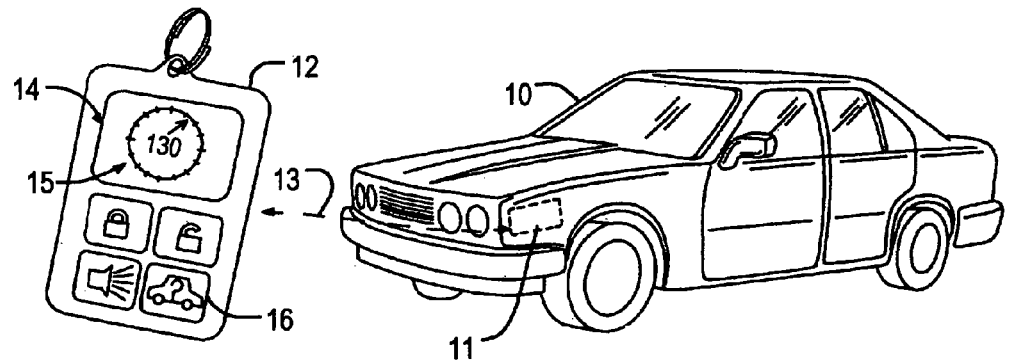
FIG. 1 shows a portable fob in communication with a vehicle-mounted location unit in a vehicle locating system.

Referring to FIG. 1, a vehicle 10 includes a vehicle-mounted location unit 11 for communicating with a portable fob 12 via a wireless link 13. Fob 12 includes a display 14 for presenting graphic and textural information 15 to display bearing information including a heading and range for directing a user to vehicle 10. Fob 12 further includes various push buttons, including a vehicle locator button 16 for initiating a request to locate the vehicle.

Figure 2:
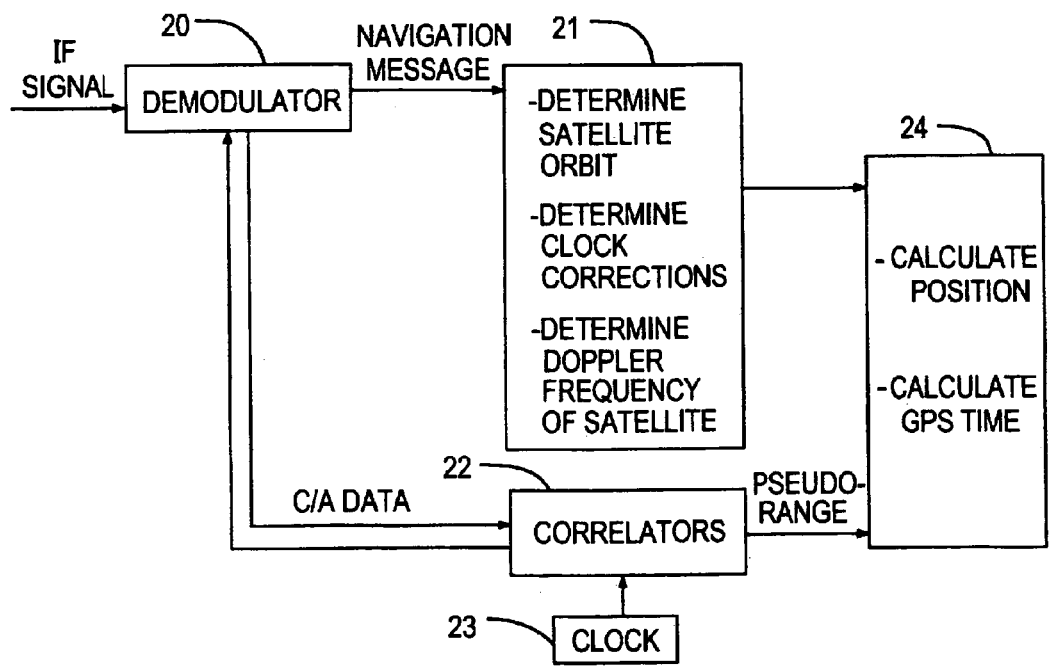
FIG. 2 is a block diagram showing a portion of a GPS receiver.

FIG. 2 shows a portion of a typical GPS receiver wherein an IF signal derived from a received satellite signal is provided to a demodulator 20. Data bits of a navigation message are provided to a block 21 for determining satellite orbit (i.e., ephemeris) information, clock corrections, a Doppler frequency of a particular satellite to be received, and other GPS data as known in the art. Demodulator 20 also provides a C/A data signal to correlators 22 in order to identify a satellite GPS signal as is known in the art. Correlators 22 receive a clock signal from a clock 23 and provide pseudo-range data to a block 24 for calculating a GPS location based on triangulation and for calculating a GPS time for correcting clock 23. An accurate position determination requires up-to-date information in block 21. In prior art GPS systems such as car locator systems, delayed results are obtained upon cold start due to the need to compile up-to-date information in block 21. According to the present invention, up-to-date information is provided to block 21 in the portable fob by obtaining navigation data from the vehicle-mounted GPS receiver which does not have the same battery power limitations.

Figure 3:
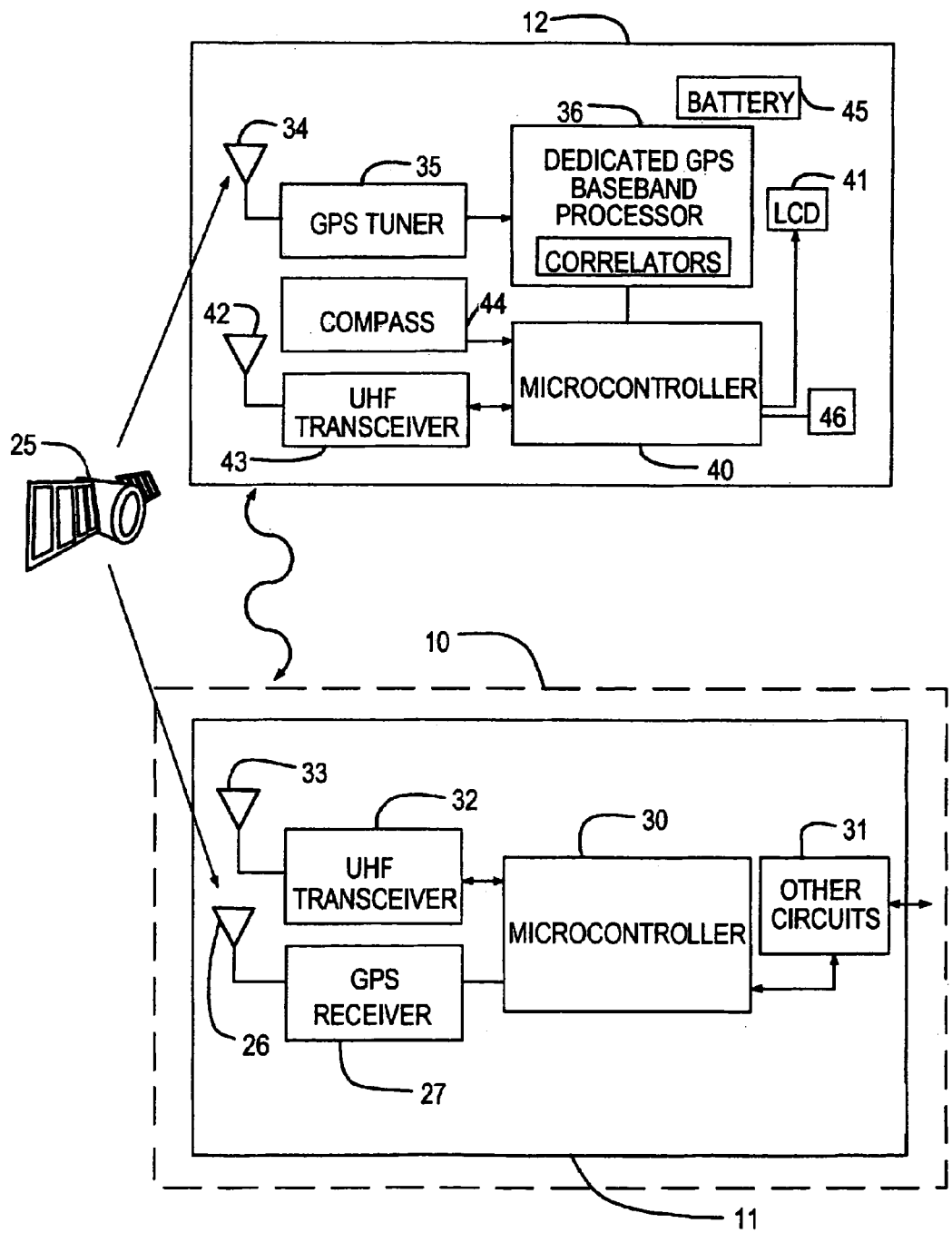
FIG. 3 is a block diagram showing a portable fob and vehicle-mounted location unit of the present invention in greater detail.

As shown in FIG. 3, GPS signals from GPS satellites 25 are received by a GPS antenna 26 in vehicle-mounted location unit 11 and are provided to a GPS receiver 27. GPS receiver 27 is powered by the electrical system of vehicle 10 including its high-capacity battery. Thus, GPS receiver 27 operates either continuously or periodically at an operating duty cycle that is sufficient to maintain data from navigation messages at reasonably current values (e.g., once every hour). The maintained information may be provided as predetermined aiding data to the portable fob for reducing its time required in order to provide a position fix for the fob. Thus, predetermined aiding data is provided from GPS receiver 27 to a microcontroller 30 which acts as a data server to provide the aiding data to fob 12 via a UHF transceiver 32 and UHF antenna 33. Microcontroller 30 also processes raw GPS data from GPS receiver 27 in order to determine a position of vehicle 11. Position information may be provided to other circuits 31 such as a vehicle navigation system for providing routing and guidance features to a driver.

Fob 12 includes a GPS antenna 34 for receiving GPs signals from satellites 25 and providing the signals to a GPS tuner 35. Raw GPS signals from tuner 35 are provided to a dedicated GPS baseband processor 36 which includes hardware correlators 37. A microcontroller 40 is responsive baseband processor 36 and correlators 37 and includes a dedicated algorithm to process aiding data received over a local data link including a UHF antenna 42 and a UHF transceiver 43. Microcontroller 40 is also coupled to an electronically controlled display such as an LCD 41 to provide the desired bearing information to a user.

In order to display a correct heading direction on LCD 41, an electronic compass 44 is coupled to microcontroller 40 so that the physical orientation of fob 12 can be determined. Each of the electronic components in fob 12 is powered by a battery 45. In order to conserve battery life, GPS operations are only performed in fob 12 when a user initiates a request for directions to the vehicle by pressing a push button 46.

Figure 4:
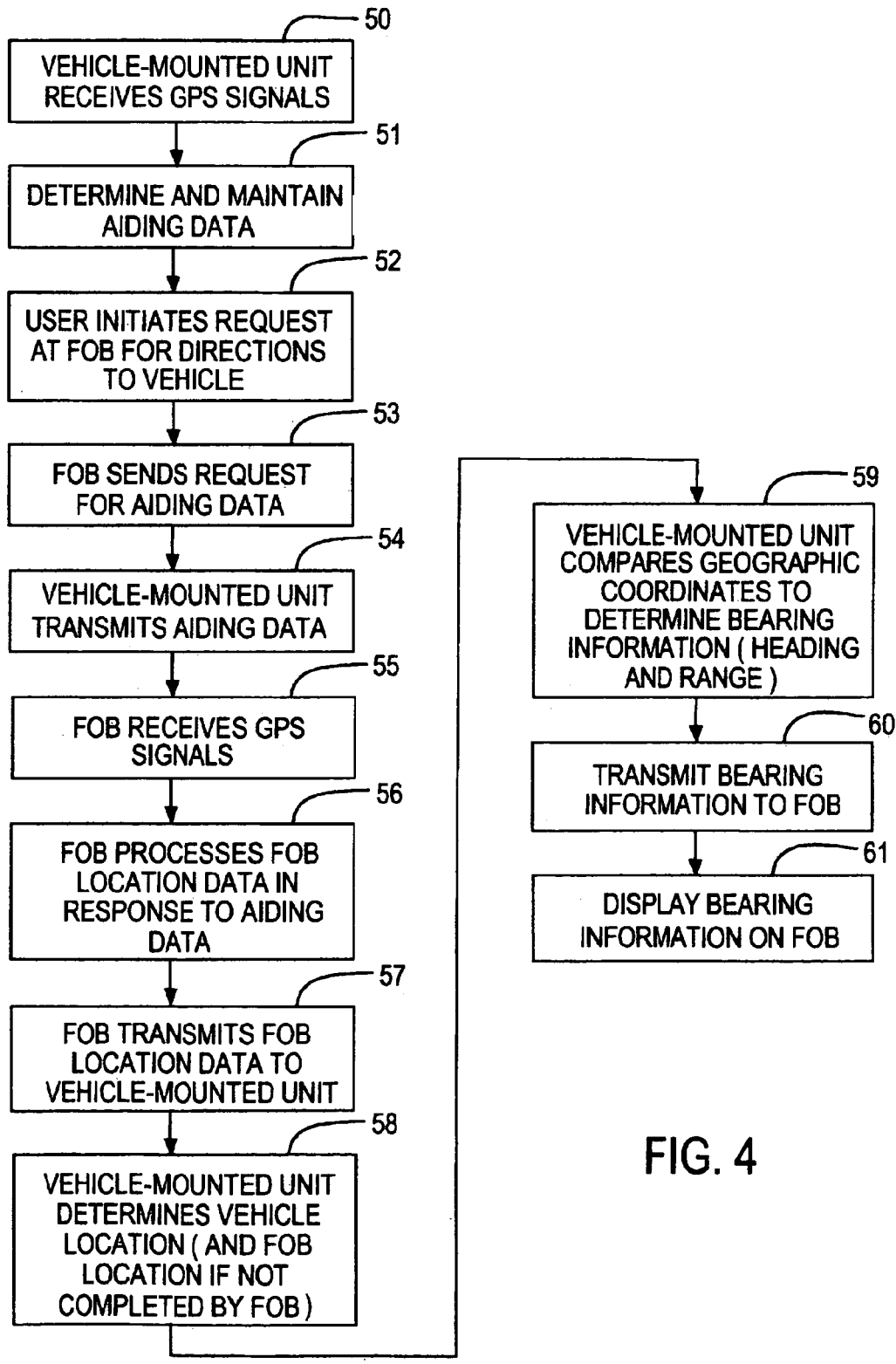
FIG. 4 is a flowchart showing a preferred method of the invention.

A preferred method of operation of the system in FIG. 3 is shown in FIG. 4. In step 50, the vehicle-mounted unit receives GPS signals at periodic intervals. The vehicle-mounted unit determines and maintains aiding data in step 51. The aiding data may comprise satellite ephemeris data, satellite clock data (i.e., clock offset information), and satellite Doppler data (an estimate of exact frequency where a particular satellite signal will fall based on its orbital motion).

A user initiates a request within the fob for the current direction from the fob to the vehicle in step 52. For example, the user may press a dedicated "locate" button on the fob. Alternatively, the locate function could be performed automatically in response to pressing of an unlock button or other stimulus. In response to the request, the fob wakes up its local data transceiver and sends a request for aiding data to the vehicle-mounted unit in step 53. In step 54, the vehicle-mounted unit transmits the aiding data using the local data transceiver. In response to the aiding data, the fob receives GPS signals in step 55 using its GPS tuner. The fob processes fob location data in response to the aiding data in step 56. In a preferred embodiment, the fob contains computing resources to perform the necessary GPS calculations to determine geometric coordinates of the fob location. In step 57, the fob transmits the fob location data to the vehicle-mounted unit using the local data transceivers. Thus, the fob location data that is transmitted from the fob to the vehicle-mounted unit preferably comprises the geometric coordinates determined for the fob. Alternatively, the GPS calculations for the fob location may be performed in the vehicle-mounted unit in response to pseudo-range data that may be sent from the fob to the vehicle-mounted unit as the fob location data.

In step 58, the vehicle-mounted unit determines the vehicle location by receiving GPS signals and performing its own GPS calculations. In addition, the vehicle-mounted unit may determine the fob location in response to pseudo-range data provided by the fob if the fob does not provide its own geometric coordinates. The vehicle-mounted unit compares the geometric coordinates of the fob and the vehicle to determine bearing information in step 59. Bearing information may include a direction heading and range from the fob coordinates to the vehicle coordinates. The bearing information is transmitted to the fob in step 60 using the local data transceivers. The bearing information is displayed on the fob in step 61 thereby allowing the user to determine the proper heading and range to the vehicle from their current location.

The present invention has provided the capability to determine the relative location of a vehicle from a portable fob in about one second or less without requiring continuous or periodic operation of fob receivers or transceivers, thereby conserving battery power. Supported by aiding data from the vehicle-mounted GPS receiver, the fob GPS receiver can fix its position within several hundred milliseconds from a cold start. The vehicle-mounted GPS receiver periodically captures predetermined aiding data from GPS satellites and works as a server to transfer the aiding data to the fob when requested. By using hardware correlators in the portable fob, increased sensitivity is obtained making operation possible indoors, such as within a parking structure. Based on the comparison of positions of the portable fob and the vehicle, a fob display gives optimized information to the user. The display to the user may also include an area map to assist in finding the way to the vehicle location. Due to the limited computing capacity and power supply capacity of the fob, the map is generated by the vehicle-mounted unit and downloaded to the fob over the local UHF data link. Known methods developed by the Dynamap Group can be used for transmitting and displaying the map on the fob.

Due to reduced battery power requirements, a tiny package size may be maintained for the portable fob. Nonetheless, a sufficiently powerful UHF transceiver using known encryption algorithms can be employed to allow the system to work up to a half mile or more from the vehicle.

What is claimed is:

1. A vehicle locating system for directing a user to a remotely-located vehicle, comprising:

a vehicle-mounted location unit including a first global positioning receiver for receiving satellite location signals, wherein said first global positioning receiver operates at a duty cycle sufficient to maintain predetermined aiding data, wherein said vehicle-mounted location unit processes vehicle location data, and wherein said vehicle-mounted location unit further includes a first local data transceiver for transmitting said predetermined aiding data; and a portable fob including a second global positioning receiver for receiving said satellite location signals, wherein said second global positioning receiver operates substantially only when said user initiates a request for directions to said vehicle, wherein said portable fob further includes a second local data transceiver for receiving said predetermined aiding data from said first local data transceiver when within reception range of said first local data transceiver, and wherein said portable fob processes fob location data in response to said predetermined aiding data;

wherein said fob location data is transmitted from said second local data transceiver to said first local data transceiver, wherein said vehicle-mounted location unit determines a bearing in response to said fob location data and said vehicle location data determined concurrently, and wherein said bearing is transmitted from said first local data transceiver to said second local data transceiver.

2. The vehicle locating system of claim 1 wherein said portable fob further includes an electronically-controlled display for displaying said bearing.

3. The vehicle locating system of claim 1 wherein said portable fob further includes a dedicated GPS baseband processor for processing said fob location data.

4. The vehicle locating system of claim 3 wherein said portable fob further includes a hardware correlator for processing said fob location data.

5. The vehicle locating system of claim 1 wherein said aiding data is comprised of satellite ephemeris data.

6. The vehicle locating system of claim 1 wherein said aiding data is comprised of satellite clock data.

7. The vehicle locating system of claim 1 wherein said aiding data is comprised of satellite Doppler data.

8. The vehicle locating system of claim 1 wherein said fob location data comprises geographic coordinates.

9. The vehicle locating system of claim 1 wherein said fob location data comprises pseudo-range data.

10. A method of directing a user to a remotely-located vehicle, wherein said user carries a portable fob communicating with a vehicle-mounted location unit, said method comprising the steps of:

periodically receiving GPS signals from a fleet of GPS satellites in said vehicle-mounted location unit;

maintaining predetermined aiding data in said vehicle-mounted location unit in response to said GPS signals;

initiating a request at said portable fob for directions to said vehicle;

transmitting said predetermined aiding data to said portable fob in response to said request when said portable fob is within reception range of said vehicle-mounted location unit;

receiving GPS signals from said fleet of GPS satellites in said portable fob in response to said request;

said portable fob processing fob location data in response to said predetermined aiding data;

transmitting said fob location data to said vehicle-mounted location unit;

said vehicle-mounted location unit determining a vehicle location;

said vehicle-mounted location unit determining bearing information in response to said vehicle location and said fob location data determined concurrently;

transmitting said bearing information from said vehicle-mounted location unit to said portable fob; and displaying said bearing information to said user.

11. The method of claim 10 wherein said predetermined aiding data comprises satellite ephemeris data.

12. The method of claim 10 wherein said predetermined aiding data comprises satellite clock data.

13. The method of claim 10 wherein said predetermined aiding data comprises satellite Doppler data.

14. The method of claim 10 wherein said step of initiating a request is comprised of activating a predetermined control element on said portable fob.

15. The method of claim 10 wherein said transmitting steps utilize respective UHF transceivers in said portable fob and said vehicle-mounted location unit.

16. The method of claim 10 wherein said fob location data comprises geographic coordinates.

17. The method of claim 10 wherein said fob location data comprises pseudo-range data.

18. The method of claim 10 wherein said bearing information comprises a direction heading.

19. The method of claim 10 wherein said bearing information comprises a direction heading and a range.

20. The method of claim 10 wherein said fob location data comprises pseudo-range data and wherein said method further comprises the step of:

said vehicle-mounted location unit determining a portable fob location in response to said pseudo-range data.

* * * * *